US010825238B2

United States Patent
Paulovich et al.

(10) Patent No.: US 10,825,238 B2
(45) Date of Patent: Nov. 3, 2020

(54) VISUAL EDGE RENDERING USING GEOMETRY SHADER CLIPPING

(71) Applicant: Microsoft Technology Licensing, LLC, Redmond, WA (US)

(72) Inventors: Jonathan Gustav Paulovich, Redmond, WA (US); Nikolai Michael Faaland, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/586,143

(22) Filed: May 3, 2017

(65) Prior Publication Data

US 2018/0322690 A1 Nov. 8, 2018

(51) Int. Cl.
| | | |
|---|---|---|
| G06T 15/30 | (2011.01) | |
| G06T 15/80 | (2011.01) | |
| G06T 15/00 | (2011.01) | |
| G06T 17/10 | (2006.01) | |
| G06T 17/30 | (2006.01) | |

(52) U.S. Cl.
CPC .......... *G06T 15/30* (2013.01); *G06T 15/005* (2013.01)

(58) Field of Classification Search
None
See application file for complete search history.

(56) References Cited

U.S. PATENT DOCUMENTS

| 7,705,845 | B1* | 4/2010 | Parikh | G06T 15/30 |
| | | | | 345/421 |
| 8,044,951 | B1* | 10/2011 | Brown | G06T 15/005 |
| | | | | 345/419 |
| 8,698,818 | B2 | 4/2014 | Pelton et al. | |
| 9,064,333 | B2 | 6/2015 | Crow et al. | |
| 9,280,449 | B2 | 3/2016 | Roegelein et al. | |
| 2009/0195541 | A1* | 8/2009 | Peng | G06T 15/005 |
| | | | | 345/420 |
| 2009/0295930 | A1* | 12/2009 | Deng | H04N 5/23248 |
| | | | | 348/208.99 |
| 2009/0303240 | A1* | 12/2009 | Yamauchi | G06T 11/00 |
| | | | | 345/441 |

(Continued)

OTHER PUBLICATIONS

"Tutorial 24: Clipping Planes", http://www.rastertek.com/dx11tut24.html, Published on: 2008, 12 pages.

(Continued)

*Primary Examiner* — Tize Ma
(74) *Attorney, Agent, or Firm* — Alleman Hall Creasman & Tuttle LLP (57) ABSTRACT

A three-dimensional (3D) object is configured for presentation on a display screen. Object data representing a model of a 3D object is received at a graphics processing unit. The object data includes a plurality of interrelated polygons. Coordinates for one or more clipping boundaries are also received at the graphics processing unit. The clipping boundaries definer a presentation region that overlaps at least in part with visible portions of the display screen. Using a geometry shader, per-polygon clipping is performed on each polygon of the object data that intersects with at least one clipping boundary. Only portions of the 3D object that lie within the presentation region are then presented on the display screen.

20 Claims, 7 Drawing Sheets

(56) References Cited

U.S. PATENT DOCUMENTS

| | | | |
|---|---|---|---|
| 2012/0229445 A1* | 9/2012 | Jenkins | G06T 15/60 345/418 |
| 2014/0168213 A1 | 6/2014 | Rice | |
| 2014/0340390 A1* | 11/2014 | Lanman | G06T 15/04 345/419 |
| 2015/0084981 A1 | 3/2015 | Clarberg | |
| 2015/0091890 A1 | 4/2015 | Andrysco et al. | |
| 2017/0091985 A1* | 3/2017 | Bhiravabhatla | G06T 15/30 |

OTHER PUBLICATIONS

"Shader Stages", https://msdn.microsoft.com/en-us/library/windows/desktop/bb205146%28v=vs.85%29.aspx, Published on: Nov. 28, 2011, 4 pages.

Goulas, et al. "3D Mapping from High Resolution Satellite Images", In Proceedings of 1st International Remote Sensing and Geoinformation Conference, Apr. 2013, 25 pages.

"Geometry Shaders", https://forums.hololens.com/discussion/2130/geometry-shaders, Retrieved on: Sep. 28, 2013, 3 pages.

Patidar, et al. "Exploiting the Shader Model 4.0 Architecture", In Journal of Center for Visual Information Technology, Mar. 2006, 9 pages.

"HLSL geometry shader not visible in emulator and device recorded video?", https://forums.hololens.com/discussion/2491/hlsl-geometry-shader-not-visible-in-emulator-and-device-recorded-video, Retrieved on: Sep. 28, 2013, 2 pages.

"Microsoft/GalaxyExplorer", https://github.com/Microsoft/GalaxyExplorer, Retrieved on: Sep. 28, 2013, 7 pages.

PUIU TIBI, "New interactive military holographic 3D map by DARPA", http://www.zmescience.com/research/new-interactive-military-holographic-3d-map-by-darpa-3214344/, Published on: Mar. 29, 2011, 4 pages.

* cited by examiner

VISUAL EDGE RENDERING USING GEOMETRY SHADER CLIPPING

BACKGROUND

See-through display devices may present holographic images in the context of real-world objects to generate mixed reality imagery. The holographic images may be manipulated to avoid overlapping with real-world objects and other holographic images.

DETAILED DESCRIPTION

Three-dimensional objects may need to be truncated for presentation on a display screen. In general, object truncation is performed in order to clip an object at the boundaries of a display screen. Pixels that would be outside of the display area are ignored and may be discarded, as there is no reason to retain or present information pertaining to the clipped data.

In some scenarios, such as when rendering an object for presentation on a see-through display, it may be desirable to present a truncated version of the object such that the object is truncated within the boundaries of the see-through display. This type of edge clipping may limit the real-world size of the object so that it doesn't encroach on the user's space, and so that the object doesn't overlap with real-world objects or other holographic objects. However, efficient, highly controllable processing may be needed to run real-time image processing in this fashion, particularly if the object-boundary intersections change over time. Power consumption must also be accounted for if the operation is to be executed on a battery-operated device, such as a head-mounted display.

As an example, an object may be truncated before entering the graphics pipeline, e.g., at the central processing unit (CPU). The central processor could be used to prepare and optimize the geometry for the truncated object. However, edge clipping via the CPU may give the boundaries of the truncated object the appearance of being sheared off, and thus be visually unappealing. Further, data for the truncated object must then be sent to the graphics processing unit (GPU) for rendering in the graphics pipeline. This transfer, particularly for real-time image rendering, can be costly and impose pressure on the system bus.

Alternately, truncation may be performed at the pixel shader in the graphics pipeline. However, the pixel shader must be run for every single pixel of the object, potentially resulting in millions of operations per frame. This can be expensive both in terms of computational power and actual power consumed. Further, this would mean that the entire non-truncated object would be processed at each preceding stage of the graphics pipeline. Indeed, much of the work done by the rasterizer would be discarded during subsequent truncation.

Herein, examples are presented whereby a geometry shader is utilized to truncate a 3D object based on intersections of the object with clipping boundaries. The geometry shader may define new object edges for the truncated object at the object/boundary intersections. A pixel shader may render for display only portions of the object that lie within the clipping boundaries. The pixel shader may also render the object edges for display based on a predetermined edge treatment. By clipping significant portions of the object at this point in the graphics pipeline, the demand on both the pixel shader and system bus is reduced, realizing additional power efficiency. Further, it may be more visually appealing if portions of the object that would otherwise be visible are clipped such that a new object edge is created and a visible edge effect is rendered.

Figure 1:
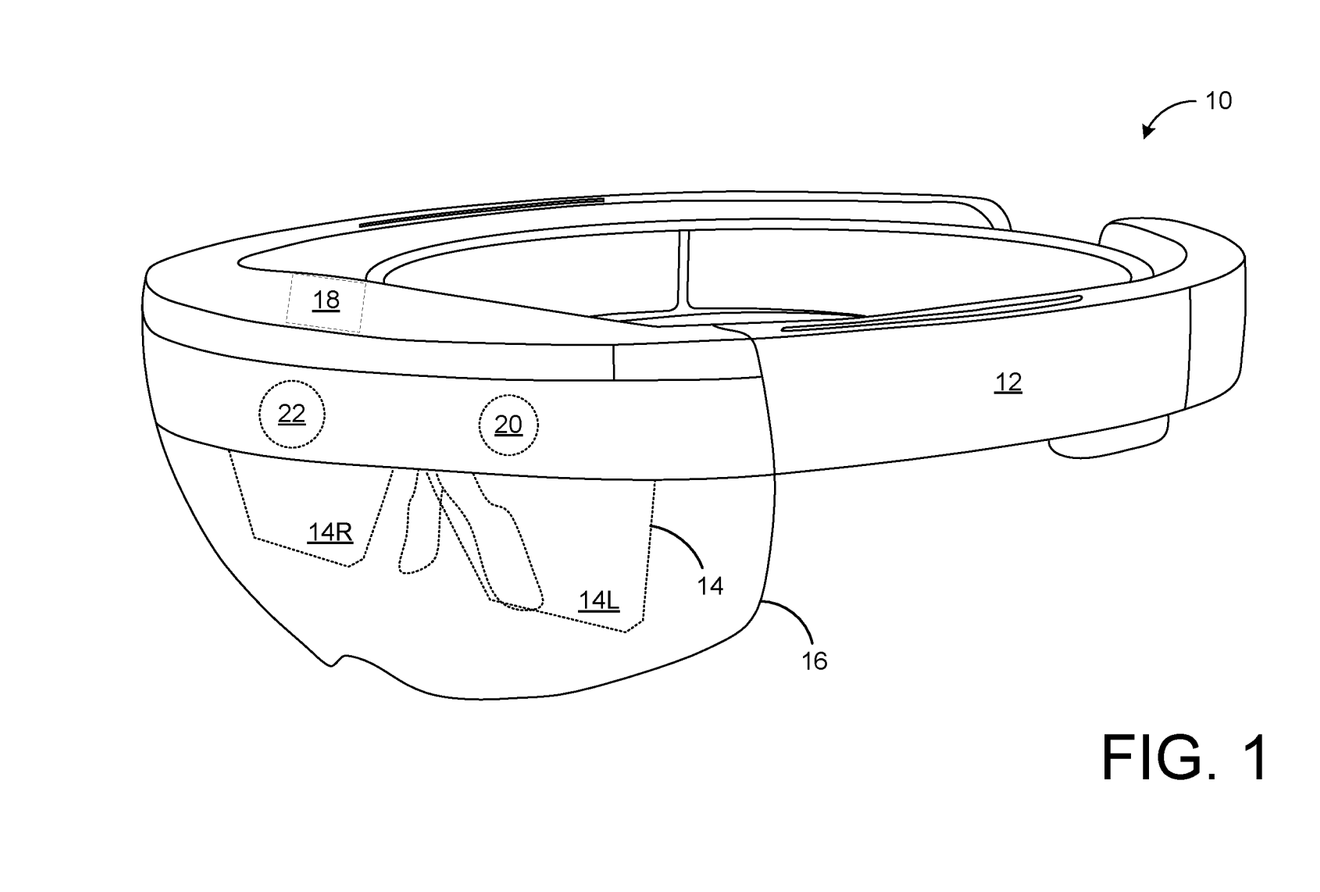
FIG. 1 shows a schematic view of a head-mounted display device according to an example of the present disclosure.

FIG. 1 schematically illustrates an example head-mounted display device 10. Head-mounted display device 10 includes a frame 12 in the form of a band wearable around a head of user that supports see-through display componentry positioned nearby the user's eyes. Head-mounted display device 10 may use augmented reality technologies to enable simultaneous viewing of virtual display imagery and a real-world background. As such, head-mounted display device 10 may generate virtual images via see-through display 14, which includes separate right and left eye displays 14R and 14L, and which may be wholly or partially transparent. See-through display 14 may take any suitable form, such as a waveguide or prism configured to receive a generated image and direct the image towards a wearer's eye.

See-through display 14 may include a backlight and a microdisplay, such as liquid-crystal display (LCD) or liquid crystal on silicon (LCOS) display, in combination with one or more light-emitting diodes (LEDs), laser diodes, and/or other light sources. In other examples, see-through display 14 may utilize quantum-dot display technologies, active-matrix organic LED (OLED) technology, and/or any other suitable display technologies. It will be understood that while shown in FIG. 1 as a flat display surface with left and right eye displays, see-through display 14 may be a single display, may be curved, or may take any other suitable form.

Head-mounted display device 10 further includes an additional see-through optical component 16, shown in FIG. 1 in the form of a see-through veil positioned between see-through display 14 and the real-world environment as viewed by a wearer. A controller 18 is operatively coupled to see-through optical component 16 and to other display componentry. Controller 18 includes one or more logic devices and one or more computer memory devices storing instructions executable by the logic device(s) to enact functionalities of head-mounted display device 10. Head-mounted display device 10 may further include various other components, for example a two-dimensional image camera 20 (e.g. a visible light camera and/or infrared camera) and a depth imaging device 22, as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Figure 2:
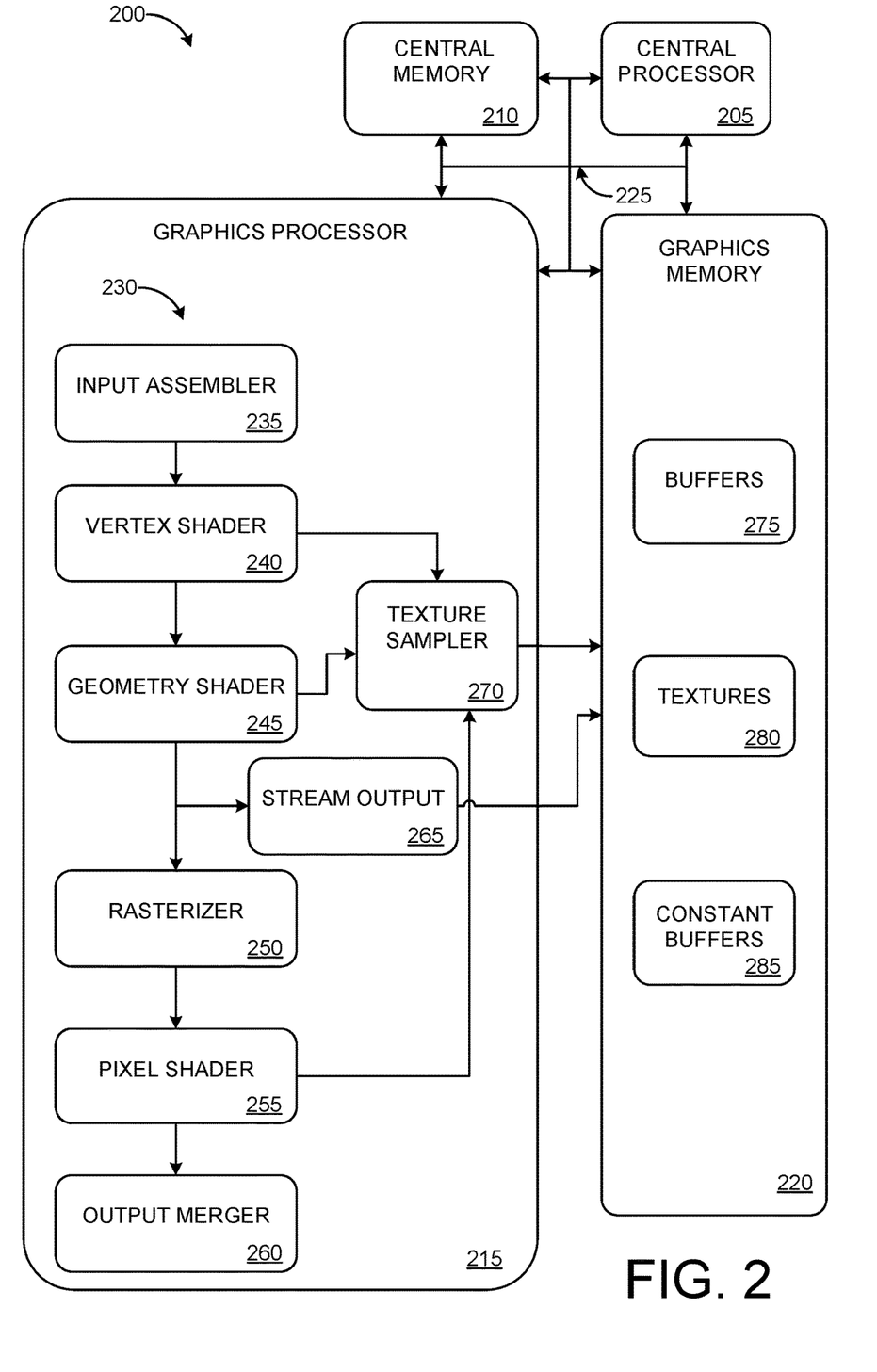
FIG. 2 schematically shows a controller including a graphics pipeline usable for transforming data into images for presentation on a display.

FIG. 2 schematically shows an example controller 200. Controller 200 may be an example of controller 18. Controller 200 may include one or more central processors 205, e.g., a central processing unit (CPU). Central processor 205 may function to perform various types of data processing for controller 200. Central memory 210 may be configured to store data and/or instructions for processing by central processor 205. Controller 200 may further include graphics processor 215 and graphics memory 220. Graphics processor 215 may function to perform various graphics related tasks for controller 200. Graphics processor 215, for example, may represent a graphics processing unit (GPU) for head-mounted display device 10.

One or more busses 225 may directly or indirectly couple central processor 205, central memory 210, graphics processor 215, and graphics memory 220. For example, bus 225 may represent a data bus, and address bus, and/or a combination thereof. Bus 225 may additionally or alternatively couple controller 18 to one or more input/output (I/O) ports and/or components.

Graphics processor 215 may be coupled to a video encoder/video codec (coder/decoder) to form a graphics processing pipeline for high speed and high resolution graphics processing. Bus 225 may facilitate transfer of data between graphics processer 215 and the video encoder/video codec. Outputs of the graphics processing pipeline may be output to an audio/video (A/V) port for transmission to a display, such as see-through display 14 and/or other displays. For example, graphics processor 215 and graphics memory 220 may be components of a graphics card for head-mounted display device 10, and may be capable of presenting holographic, three-dimensional (3D) graphics on see-through display 14.

A 3D object is typically constructed out of a plurality of polygons, with each corner of a polygon defining a vertex. Each polygon may be a triangle and thus include three vertices. The collection of polygons that make up a 3D object may be commonly known as a mesh. Before a given mesh can be displayed on see-through display 14, it may first be converted into an array of colored dots, commonly known as pixels. Graphics processor 215 and graphics memory 220 may be configured to allow changing and/or modification of the appearance of meshes. For example, a mesh may be animated, colored, shaded, etc. A collection of programs used to make these changes may be known as a graphics pipeline.

The graphics pipeline may include one or more shaders. Shaders may operate on either the pixels making up the 3D mesh before display, or directly on the vertices themselves. Shaders may operate on both the vertex and pixel data simultaneously. Vertex shaders may modify the position of an object or mesh either through a transform or an animation, for example. Pixel shaders may adjust the appearance of an object or mesh such as an object's color and/or the way in which the object is lit, for example. A mesh processed by one or more shaders may be written to memory, where it can be accessed and rendered for display on a display device.

FIG. 2 schematically depicts an exemplary graphics pipeline 230 may be performed at a graphics processing unit, such as graphics processor 215. Graphics pipeline 230 includes a plurality of stages for transforming data into images to be displayed on a display device, such as see-through display 14. Graphics pipeline 200 includes input assembler 235, vertex shader 240, geometry shader 245, rasterizer 250, pixel shader 255, and output merger 260. Graphics pipeline may further include stream output stage 265 and texture sampler 270. Stream output stage 265 and texture sampler 270 may be configured to facilitate communication between graphics pipeline 230 and graphics memory 220. It will be appreciated that graphics pipeline 230, as depicted in FIG. 2 is exemplary, and additional components may be added or components removed.

Graphics pipeline 230 includes both fixed function and programmable stages. Fixed function stages may include, but are not limited to, input assembler 235, rasterizer 250, output merger 260, and texture sampler 270. Programmable graphics stages include vertex shader 240, geometry shader 245, and pixel shader 255.

Input data for graphics pipeline 230 may include one or more models, each model including a plurality of vertices that create a mesh of triangles. Input assembler 235 may receive the one or more models and may read vertices out of memory using fixed function operations and/or forms geometry. Input assembler may then create pipeline work items and supply work item data (e.g., triangles, lines, and points) to graphics pipeline 230. The work item data may comprise data indicating the position of vertices, and/or other data related to a 3D mesh. The work item data may be read from graphics memory 220, for example. However, the stream data may also be read from central memory 210. Shaders 240, 245, and 255 may be executed at graphics processor 215 on work item data.

Work item data may be passed from input assembler 235 to vertex shader 240. Vertex shader 240 is a graphics processing function that may be used to add special effects to objects in a 3D environment by performing mathematical operations on the objects' vertex data. Vertex shader 240 may process vertices within the work item data, performing per-vertex operations such as transformations, skinning, morphing, and per-vertex lighting. Vertex shader 240 may take a single input vertex and produce a single output vertex. If no vertex modification or transformation is required, a pass-through vertex shader may be created and deployed within graphics pipeline 230. Vertex shader 240 may be run on all input vertices, including adjacent vertices in input primitive topologies with adjacency.

Each vertex manipulation may be coordinated, such as in projecting an object for the correct perspective from a given user's viewpoint. Vertex shader 240 may retrieve additional data from graphics memory 220, such as data stored in one or more buffers 275, one or more textures 280, and one or more constant buffers 285. For example, each buffer 275 may include a collection of elements (e.g., raw data). A vertex buffer may contain per-vertex data. A simple vertex buffer may contain one type of data, such as position data. In some examples, a vertex buffer could contain per-vertex position, normal and texture coordinates.

An index buffer may contain a sequential set of 16-bit or 32-bit indices. Each index may be used to identify a vertex in a vertex buffer. An index buffer may be configured to stitch together multiple line or triangle strips, and thus be utilized to draw multiple line or triangle strips with a single draw call.

Geometry shader (GS) 245 may generate new graphics primitives, such as points, lines, and triangles, from those primitives that were sent to the beginning of the graphics pipeline. The geometry shader may run application-specified shader code with vertices as input and the ability to generate vertices as output. The geometry shader stage processes entire primitives. The GS input is a full primitive (e.g., three vertices for a triangle, two vertices for a line, or a single vertex for a point). In addition, each primitive may also include the vertex data for any edge-adjacent primitives. This additional data may include up to an additional three vertices for a triangle or an additional two vertices for a line. The geometry shader may also support limited geometry amplification and de-amplification.

Given an input primitive, the geometry shader may discard the primitive, or emit one or more new primitives. The geometry shader may be configured to output multiple vertices forming a single selected topology. GS output may be fed to rasterizer 250 and/or to a buffer 275 in graphics memory 220 via stream output 265. Output fed to graphics memory 220 is expanded to individual point/line/triangle lists (e.g., as they would otherwise be passed to the rasterizer). Constant buffers 285 may be configured to supply geometry shader 215 with shader constants. Constant buffers 285 thus reduce the bandwidth required to update shader constants by allowing shader constants to be grouped together and committed at the same time rather than making individual calls to commit each constant separately.

Stream output 265 may be configured for streaming primitive data from graphics pipeline 230 to graphics memory 220 on its way to rasterizer 250. Data can be streamed out and/or passed into rasterizer 250. Data streamed out to graphics memory 220 may be recirculated back into graphics pipeline 230 as input data or may be read-back from central processor 205. Stream output 265 allows for the continuous output (or streaming) of vertex data from geometry shader 245 (or from vertex shader 240 if geometry shader 245 is inactive) to one or more constant buffers 285 in graphics memory 220.

Rasterizer 250 may convert vector information (composed of shapes or primitives) into a raster image (composed of pixels) for the purpose of displaying 3D graphics. Rasterization may include clipping vertices to a view frustum, performing a perspective divide to transform the points into homogeneous space, mapping primitives to a 2D viewport, and/or determining how to invoke pixel shader 255. During rasterization, each primitive is converted into pixels, while interpolating per-vertex values across each primitive. Rasterization clipping may include clipping the edges of one polygon that lies outside of another polygon.

Pixel shader 255 serves to manipulate a pixel color, such as to apply an effect on an image, for example; realism, bump mapping, shadows, and explosion effects, enabling rich shading techniques such as per-pixel lighting and post-processing. Pixel shader 255 is a graphics function that calculates effects on a per-pixel basis. Pixel shader 255 receives interpolated data for a primitive and generates per-pixel data such as color. Input data to pixel shader 255 may include vertex attributes or may be treated as per-primitive constants. Rasterizer 250 invokes pixel shader 255 once for each pixel covered by a primitive, however, it is possible to specify a NULL shader to avoid running pixel shader 255 for a particular pixel. Input data to pixel shader 255 are interpolated from the vertex attributes of the primitive being rasterized based on the declared interpolation mode. If a primitive gets clipped before rasterization, the interpolation mode may be honored during the clipping process as well.

Texture sampler 270 may be utilized by vertex shader 240, geometry shader 245 and pixel shader 255 to fetch data from graphics memory 220. Texture sampler 270 may perform texture filtering operations and texture addressing modes, and may convert data between different formats. Texture sampler 270 may define how textures 280 are sampled and filtered. Each texture 280 is a structured collection of data indicating texels (texture elements). A texel represents the smallest unit of a texture that can be read or written to by graphics pipeline 230. Textures 280 may be filtered by texture sampler 270 as they are read by shader units 240, 245, and 255.

Output merger 260 is a fixed function and may perform operations such as blend, depth and stencil. Output merger 260 may be responsible for combining various types of output data (e.g., pixel shader values, depth, and stencil information) with the contents of the render target and depth/stencil buffers to generate the final pipeline result.

Object data to be rendered for presentation on a display screen may enter the graphics pipeline as a set of polygons that are interrelated to each other. In some scenarios, the object may be truncated prior to being presented. For example, a boundary may separate the display screen into a first region where portions of the object are presented and a second region where portions of the objects are not presented. As such, polygons intersecting with the boundary must be clipped, as the edges of the polygons rarely line up with the visual edge of the object. Any portion of a polygon that lies within the second region may be discarded.

Figure 3:
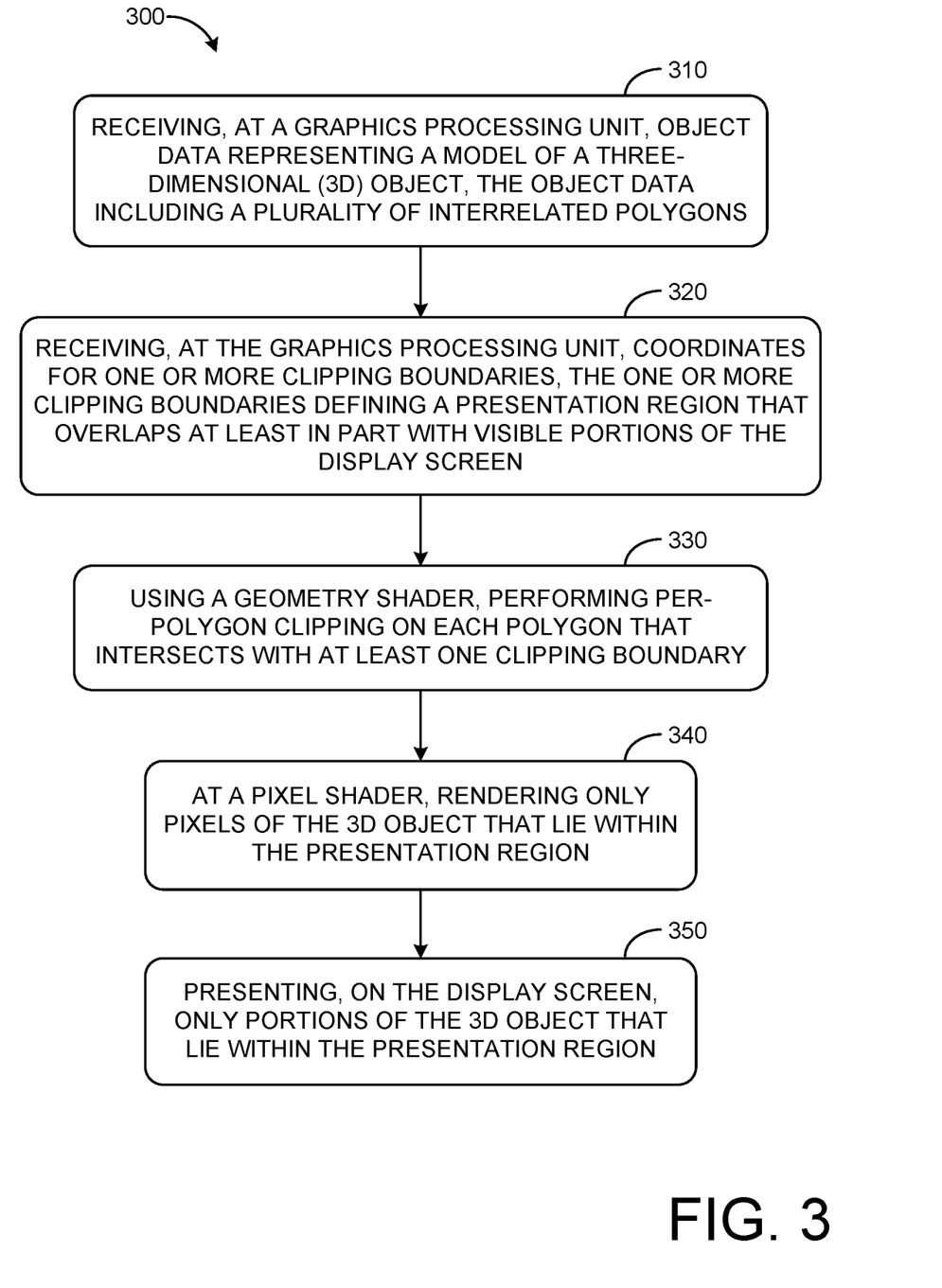
FIG. 3 shows a flow-chart for an example method for presenting three-dimensional objects on a display screen.

FIG. 3 shows a flow-chart for an example method 300 for presenting a three-dimensional (3D) object on a display screen, such as see-through display 14. At 310, method 300 includes receiving, at a graphics processing unit, object data representing a model of a three-dimensional object, the object data including a plurality of interrelated polygons. Each polygon may include three or more vertices, and each vertex may be shared by two or more polygons. Each polygon may include three or more edges, and each edge may be shared by two or more polygons. In some examples, each polygon may be a triangle, and thus include three vertexes and three edges. The polygons may be contiguous or non-contiguous. Object data may thus be received for two or more three-dimensional objects that are to be co-displayed on the display screen.

Object data may further include position and/or coordinate information pertaining to where the object is to be presented on the display screen, to the size of the object on the display screen, at what orientation to the user, to other holographic objects, and/or to real world objects the object is to be displayed, etc. For example, each vertex may include coordinate and/or vector information defining a spatial position and other attributes for the vertex. Object data may further include information regarding color, reflectance, texture, surface vectors, weighting, blending, etc. Such information may be included on a per-vertex basis, per-edge basis, and/or per-polygon basis.

At 320, method 300 includes receiving, at the graphics processing unit, coordinates for one or more clipping boundaries, the one or more clipping boundaries defining a presentation region that overlaps at least in part with visible portions of the display screen. For example, the clipping boundaries may define a portion of the display screen wherein the object is to be confined. The clipping boundaries may collectively define a presentation region wherein portions of the object are to be presented, and may define a non-presentation region wherein portions of the object are not to be presented.

As an example, the clipping boundaries may be planar. For example, a clipping boundary may represent a wall extending vertically across the display screen, dividing the display screen into first (presentation) and second (non-presentation) regions. However, the clipping boundaries may also be spherical, elliptical, or otherwise curved and/or irregular. Where multiple clipping boundaries are received, the clipping boundaries may intersect (e.g., forming a box or other confined region) or may not intersect (e.g., parallel planes). Clipping boundaries may extend from one edge of the display screen to another, or may be confined within the edges of the display screen. In some examples, the clipping boundaries may extend outside the edges of the display screen. For example, a planar clipping boundary may extend beyond infinitely past the top boundary of the display screen. Thus, the clipping boundaries may continue to divide the display screen, even as a user's field of view changes.

In some examples, one or more clipping boundaries may be fixed to a real-world object visible through the display screen. As an example, clipping boundaries may extend upwards from edges of a real-world table, defining a presentation region that extends upwards from the table surface. Such an example is described herein with regard to FIG. 6.

In some examples, one or more clipping boundaries may be fixed to a virtual-world object presented on the display screen. For example, a virtual portal may be presented on the display screen that is two dimensional. The presentation region may thus include the entirety of the display screen, excepting for virtual objects that enter the portal from one side. Portions of the virtual objects entering the portal may thus appear to be truncated.

At 330, method 300 includes, using a geometry shader, performing per-polygon clipping on each polygon that intersects with at least one clipping boundary. As the geometry shader can handle polygons (e.g., triangles) and lines and not just vertices, this allows the object clipping process to be adapted based on the properties of the polygon and the polygon's intersection with clipping boundaries. This allows for additional clipping options which can be applied discriminately, thus yielding a more controlled process that is more akin to manual object processing. The geometry shader may add and remove vertices from polygons during the clipping process, thereby reducing the amount of work required from the rasterizer and pixel shader.

Polygons that do not intersect with at least one clipping boundary and lie entirely within a non-presentation region may be discarded without being clipped. Polygons that do not intersect with at least one clipping boundary and lie entirely within a presentation region may be passed through the graphics pipeline without being clipped by the geometry shader.

Per-polygon clipping may be performed based on a number of clipping boundaries that intersect with each polygon. In examples where each polygon is a triangle, a modified triangle clipper may be utilized to clip each triangle. Rather than attempting to clip each edge of the triangle, the modified triangle clipper may only attempt to clip as many edges as are known to intersect a clipping boundary. If a triangle intersects with a single clipping boundary, the triangle may be assumed to be clipped at most once. Each such triangle may thus be passed through the triangle clipper once, and then passed down the graphics pipeline. If a triangle intersects with two clipping boundaries, the triangle may be assumed to be clipped at most twice. Each such triangle may thus be passed through the triangle clipper twice, and then passed down the graphics pipeline.

Triangles may need to be clipped multiple times if they overlap multiple clipping boundaries. If a triangle intersects with more than two clipping boundaries, the triangle may be passed through the triangle clipper two or more times. Further, iterative per-triangle clipping may be performed on each clipped triangle resulting from the initial clipping iteration.

In some examples, non-polygonal primitives (e.g., vertices and lines) may extend into a non-presentation region. Such primitives may be clipped by the geometry shader at a clipping boundary using suitable clipping methods.

The intersection of each clipping boundary and the truncated object may define an object edge. As such, the geometry shader may designate each primitive (e.g., vertex, line, polygon) within the clipped model that coincides with one or more clipping boundaries as an edge primitive. Primitives that are adjacent to edge primitives may be designated as such. Further, a distance to the nearest clipping boundary may be appended to each primitive within the presentation region. In some examples, "cap pieces" may be added to primitives which may define how the primitive is handled at the rasterizer and/or pixel shader.

As described with regard to FIG. 2, the geometry shader may output a clipped data set for the 3D object which is then converted to pixels by a rasterizer. New data generated at the geometry shader, such as edge distances, may be preserved by the rasterizer and appended to the data for each corresponding pixel. For example, pixel that coincide with one or more clipping boundaries may be designated as edge pixels. The rasterizer may then output object data representing a clipped model of the 3D object to a pixel shader.

At 340, method 300 includes, at the pixel shader, rendering only pixels of the 3D object that lie within the presentation region. In other words, portions of the 3D object that have been clipped at the geometry shader due to lying outside the presentation region are not rendered by the pixel shader. In some examples, the pixel shader may render the object edge differently than portions of the object that lie on the interior of the presentation region. For example, each pixel that coincides with one or more clipping boundaries may be rendered with a predetermined edge treatment. Examples of edge treatment are described with regard to FIGS. 5 and 6.

At 350, method 300 includes presenting, on the display screen, only the portions of the 3D object that lie within the presentation region. In other words, portions of the 3D object that have been clipped at the geometry shader due to lying outside the presentation region are not presented on the display screen.

The process flow shown in FIG. 3 may be performed for each frame of images presented on the display screen. Thus, if the 3D object and clipping boundaries move relative to each other, the object-boundary interface may change and the primitives that are designated as edge primitives may change. As such, the process may be initiated for a subsequent frame with the receipt of object data and clipping boundaries at the geometry shader, the object data including data for the entire 3D object (e.g., all vertices, including those previously clipped). However, some data from previous clipping operations may be retained (e.g., at graphics memory 220) and applied to the object data. In this way, the speed of re-rendering the object may be increased, and any applied effects may be presented across frames in a fluid manner.

The geometry shader has access to same object data and constructs as does the CPU, but can render this data without transfer via the system bus. By performing object truncation on the GPU, parallelization is enabled, and bus transfer time is reduced. For example, while the GPU can run this process at 60 fps, the CPU would be reduced to 15-20 fps, which would make an immersive holographic experience challenging for the user to enjoy. Many rendering algorithms disable the geometry shader to save power. However, by performing the clipping effect in the geometry shader, the need to shade pixels outside of the visual region is eliminated. The total savings on the pixel shader side thus offsets any additional power consumption generated by the activation of the geometry shader. By reducing the total amount of power consumed, the system uses less battery power, has decreased thermal temperature, and realizes increased GPU efficiency.

Figure 4A:
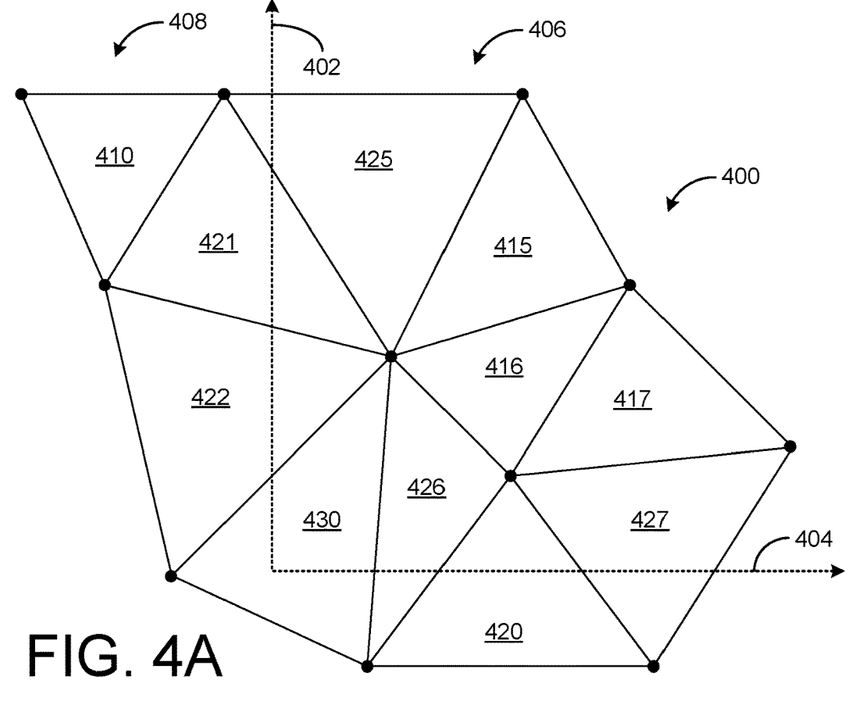
FIG. 4A shows example data for an unclipped object including a plurality of triangles.
Figure 4B:
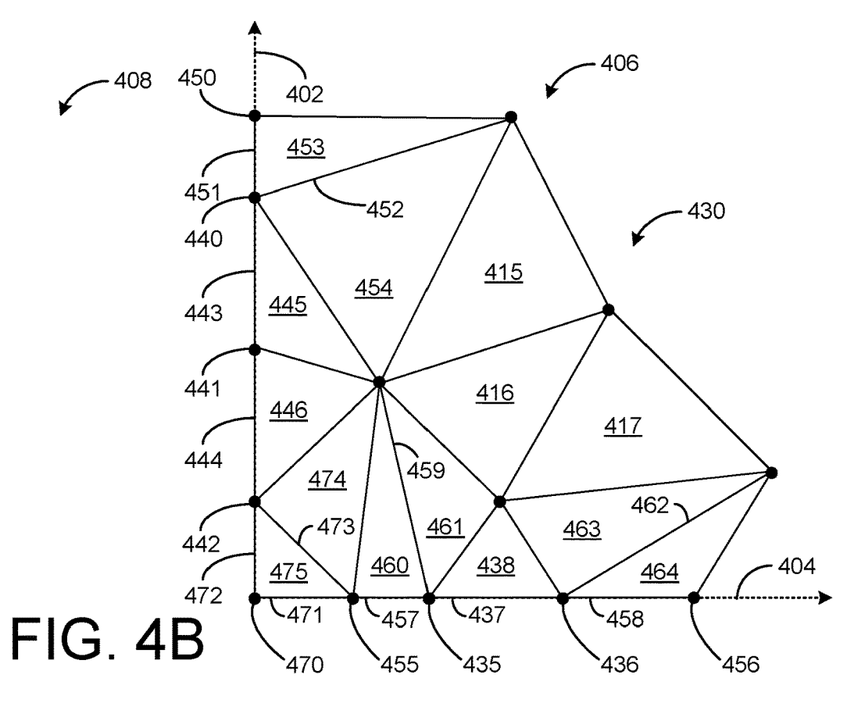
FIG. 4B shows example data for the object of FIG. 4A following clipping based on intersections with clipping boundaries.

FIGS. 4A and 4B depict a simplified, two-dimensional example of object truncation performed using a geometry shader. FIG. 4A depicts an object 400 comprising a plurality of polygons (triangles), lines, and vertices. Object 400 is intersected by clipping boundaries 402 and 404. Clipping boundaries 402 and 404 define a presentation region 406 and a non-presentation region 408.

As described with regard to FIG. 3, object 400 may be truncated using a geometry shader to clip triangles that extend into non-presentation region 408. Triangle 410 lies entirely within non-presentation region 408, and thus may be discarded. Triangles 415, 416, and 417 lie entirely within presentation region 406, and thus may be passed through the geometry shader without clipping. Triangles 420, 421, and 422 each intersect with one clipping boundary, while having one vertex within presentation region 406. Triangles 425, 426, and 427 each intersect with one clipping boundary, while having two vertices within presentation region 406. Triangle 430 intersects with both clipping boundaries, while having one vertex within presentation region 406.

FIG. 4B depicts truncated object 430, representing object 400 following clipping at the geometry shader. Triangles 415, 416, and 417 are preserved intact from their original configuration.

Triangle 420 is shown clipped based on an intersection with clipping boundary 404. As a result, two vertices of triangle 420 are clipped. New vertices 435 and 436 are generated, as is line 437, extending between vertices 435 and 436. Triangle 438 encompasses the truncated portion of triangle 420 that lies within presentation region 406.

Similarly, triangles 421 and 422 are shown clipped based on intersections with clipping boundary 402. This results in the clipping of two vertices from each of triangles 421 and 422, including a shared vertex. New vertices 440, 441, and 442 are generated, with vertex 441 a shared vertex. New lines 443 and 444 are also generated. Triangles 445 and 446 encompass the truncated portions of triangles 421 and 422 that lie within presentation region 406.

Triangle 425 is shown clipped based on an intersection with clipping boundary 422. As a result, one vertex of triangle 425 is clipped, and new vertex 450 is generated. Line 451 is also generated, extending between vertices 440 and 450. The residual portion of triangle 425 is now a quadrilateral, and thus an additional line 452 is generated, bisecting the quadrilateral into triangles 453 and 454, each of which lie within presentation region 406.

Similarly, triangles 426 and 427 are shown clipped based on an intersection with clipping boundary 404. New vertices 455 and 456 are generated, as are lines 457 and 458, extending between vertices 435 and 455, and 436 and 456, respectively. Line 459 is also generated to produce triangles 460 and 461, while line 462 is generated to produce triangles 462 and 463.

Triangle 430 is clipped based on intersections with clipping boundaries 402 and 404. A new vertex 470 is generated, as are new lines 471 and 472, extending between vertices 455 and 470, and 442 and 470, respectively. Line 473 is also generated to produce triangles 474 and 475.

As a result of clipping object 400 into truncated object 430, 6 vertices are eliminated and 9 vertices are generated. 6 lines are eliminated, 7 lines are altered (retaining one vertex and a vector), and 12 lines are created. Object 400 includes 11 triangles, while truncated object 430 includes 15 triangles.

Additionally, new vertices 435, 436, 440, 441, 442, 450, 455, 456, and 470 may be designated edge vertices by nature of their intersection with clipping boundaries 402 and 404. Similarly, new lines 437, 443, 444, 451, 457, 458, 471, and 472 may be designated edge lines by nature of their overlap with clipping boundaries 402 and 404. Triangles that incorporate one or more edge vertices and/or one or more edge lines may be designated edge triangles (e.g., triangles 438, 445, 446, 453, 454, 460, 461, 463, 464, 474, and 475). These primitives, when converted into pixels by the rasterizer, may be rendered using one or more edge effects at the pixel shader.

The geometry shader thus may create new vertices, lines, triangles on the fly, as initial primitives are clipped. This allows for the generation of effects in real time, particularly at the newly defined edges. Edge vertices, lines, and polygons may give way to edge pixels at the rasterizer. Edge effects and edge treatments may then be generated at the pixel shader based on the defined edge pixels. This may reduce the amount of per-pixel processing, thus reducing power consumption needed to generate edge effects. Further, this may reduce the amount of time needed to perform per-pixel rendering, thus effectively generating more time per frame to perform other steps of the graphics pipeline.

Figure 5:
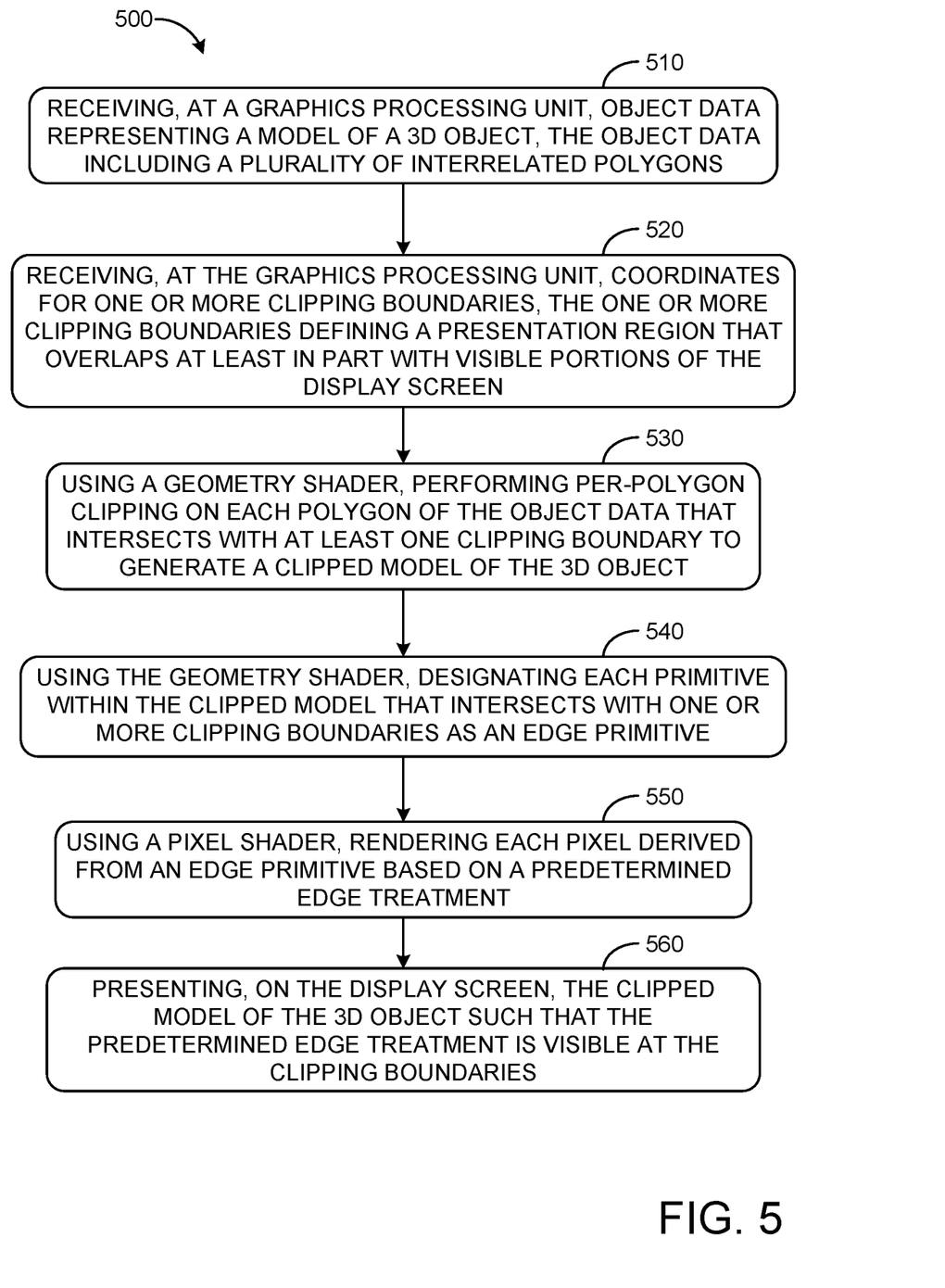
FIG. 5 shows a flow-chart for an example method for presenting three-dimensional objects on a display screen.

FIG. 5 shows a flow-chart for an example method 300 for presenting a three-dimensional (3D) object on a display screen, such as see-through display 14. At 510, method 500 includes receiving, at a graphics processing unit, object data representing a model of a three-dimensional object, the object data including a plurality of interrelated polygons. At 520, method 500 includes receiving, at the graphics processing unit, coordinates for one or more clipping boundaries, the one or more clipping boundaries defining a presentation region that overlaps at least in part with visible portions of the display screen. At 530, method 500 includes using a geometry shader, performing per-polygon clipping on each polygon of the object data that intersects with at least one clipping boundary to generate a clipped model of the 3D object.

At 540, method 500 includes, using the geometry shader, designating each primitive within the clipped model that intersects with one or more clipping boundaries as an edge primitive. As shown in FIG. 4B, edge primitives may include edge vertices which intersect with one or more clipping boundaries, edge lines which intersect with one or more clipping boundaries, and edge polygons which intersect with one or more clipping boundaries.

The geometry shader may be further configured to designate each primitive adjacent to an edge primitive as an edge-adjacent primitive. For example, a triangle which is adjacent to an edge triangle may be designated as an edge-adjacent triangle (e.g., triangle 416, and edge-adjacent triangle, is adjacent to triangle 461, an edge triangle).

The geometry shader may be further configured to indicate a distance to a nearest edge for each primitive of the clipped model of the 3D object. For example, a distance of 0 may be indicated for edge primitives, while a positive value is indicated for primitives that are interior to the model.

A rasterizer may receive the clipped model of the 3D object from the geometry shader, and may convert each primitive in the clipped model to a plurality of pixels. The rasterizer may further retain edge information for each primitive in each corresponding pixel. For example, pixels derived from edge primitives may retain the designation as edge pixels. Pixels derived from edge-adjacent primitives may retain the designation as edge-adjacent pixels. All pixels may retain a distance to a nearest edge value derived from their parent primitive.

At 550, method 500 includes, using a pixel shader, rendering each pixel derived from an edge primitive using a predetermined edge treatment. For example, the edge treatment may include rendering each edge pixel with a single color. The single color may be different from colors used at edge-adjacent pixels and/or interior pixels. The edge treatment may include a texture, color pattern, geometry, or other quality that distinguishes the edge of the 3D object from the interior of the 3D object.

In some examples, each of the plurality of pixels may be rendered at the pixel shader based on the distance to the nearest edge. This rendering may be used to generate a gradient effect. For example, a vignette effect may be produced wherein edge pixels are presented as darker than interior pixels, and wherein a shading gradient is rendered based on the distance of each pixel to the nearest edge. In other examples, the distance to the nearest edge may be used to generate a glow or halo at the object edge.

At 560, method 500 includes, presenting, on the display screen, the clipped model of the 3D object such that the predetermined edge treatment is visible at the clipping boundaries. The visibility of the predetermined edge may be based on the perspective of the user. For example, when the 3D object is presented on a see-through display screen, the user's position within a use environment may determine which clipping boundaries intersect with the display screen, and thus which edges of the 3D object are visible.

Figure 6:
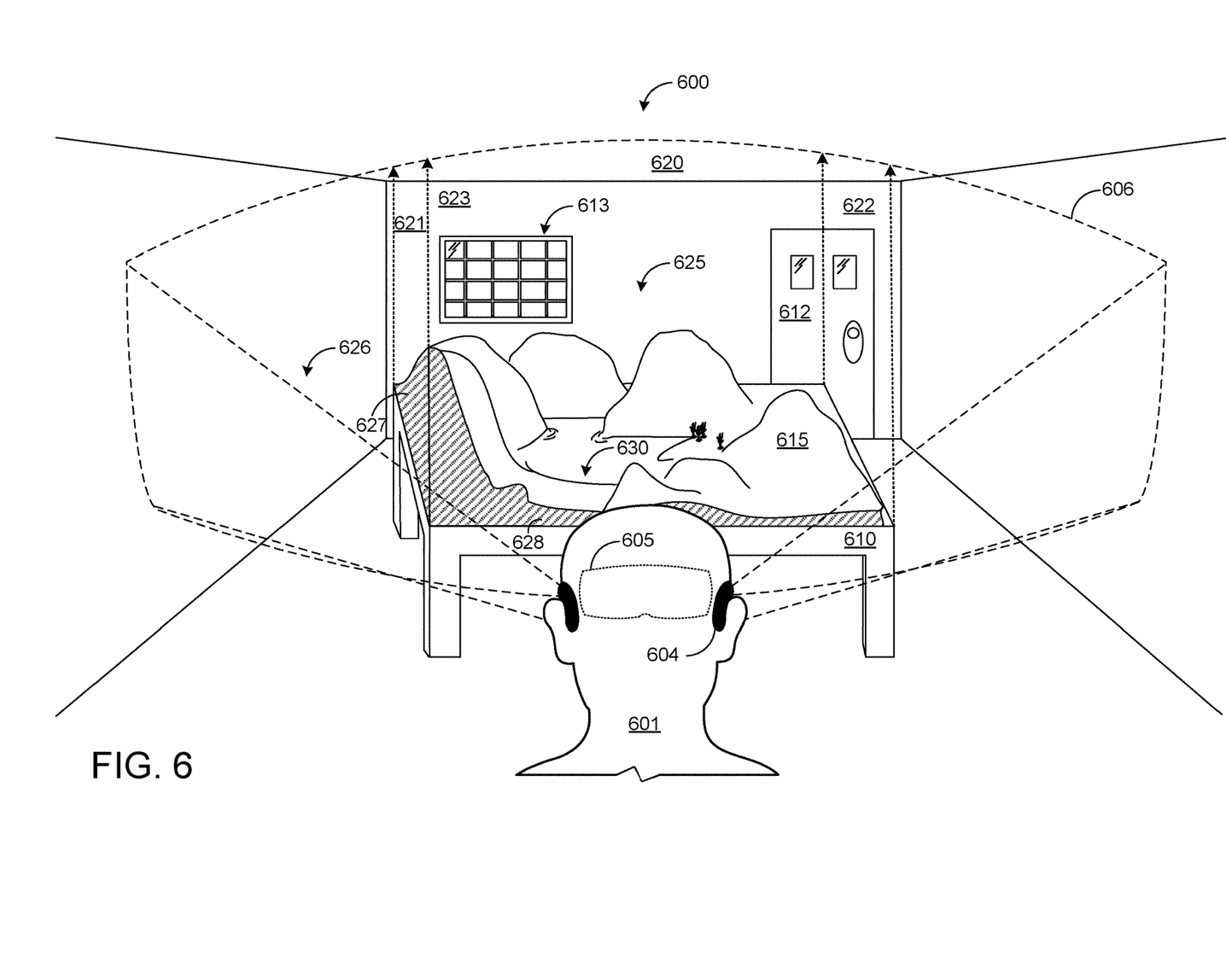
FIG. 6 shows an example mixed reality environment including a truncated three-dimensional object with a visual edge treatment.

FIG. 6 shows an example use environment 600 in which a user 601 interacts with an example head-mounted display device 604. Head-mounted display device 604 is operable to present mixed reality (MR) imagery to user 601 via a see-through display device, schematically depicted at 605. MR imagery comprises real imagery, for example as viewed through a see-through display, and virtual imagery displayed via the see-through display device 605. FIG. 6 depicts a field-of-view (FOV) 606 of see-through display device 605 representing the spatial region in which virtual imagery may be perceived by user 601. The angular extent of FOV 606 may be equal to, greater than, or less than the portion of environment 600 viewable through see-through display device 605.

Real imagery within use environment 600 includes table 610, door 612 and window 613. Virtual imagery within use environment 600 includes virtual map 615. Virtual map 615 is presented as a three-dimensional object viewable through see-through display device 602. Although only a single user 601 and a single see-through display device 602 are depicted, additional users with see-through display devices may also be able to view virtual map 615 within use environment 600.

Virtual map 615 is presented as a 3D object on the top of table 610. Clipping boundaries 620 (front), 621 (left side), 622 (right side) and 623 (rear) are depicted as planes extending upward from each edge of table 610, thus defining a presentation region 625 and a non-presentation region 626. Clipping boundaries 620-623 are utilized at a geometry shader to truncate virtual map 615 such that virtual map 615 is depicted as confined to the top of table 610, though the original object data for virtual map 615 may include object data extending in all directions that would otherwise be depicted within non-presentation region 626.

Virtual map 615 intersects with clipping boundary 621 to generate object edge 627, and with clipping boundary 620 to generate object edge 628. Both object edge 627 and object edge 628 are visible within FOV 606. Object edges 627 and 628 are presented with a striated edge treatment, while object interior 630 is presented without edge treatment.

User 601 may be enabled to adjust the orientation of virtual map 615. For example, via a natural user interface, user 601 may utilize gestures, spoken commands, etc. to navigate around virtual map 615. User 601 may rotate and/or translate virtual map 615 while virtual map 615 remains situated on the surface of table 610. As virtual map 615 is moved relative to table 610, and thus relative to clipping boundaries 620-623, the object edges may change. Object data for virtual map 615 may be passed through a graphics pipeline at head-mounted display device 604, and be re-clipped at a geometry shader, thus generating new object edges, new interior pixels, and new edge pixels. Virtual map 615 may then be re-rendered at a pixel shader to generate an adjusted image for presentation on see-through display device 605.

An object portion that translates relative to a static object may be clipped if the object portion intersects with one or more clipping boundaries. For example, a train passing through virtual map 615 may exit presentation region 625. The edge portions of the train that intersect with a virtual boundary may be rendered as an object edge, while the portions of the train that remain within presentation region 625 may be presented without alteration, and the portions of the train that lie within non-presentation region 626 may be discarded and not viewable by user 601.

The object edge of a 3D object may be rendered as a cross section of the 3D object. For example, object edge 627 may be rendered such that soil, sediment, and crust layers of earth are visible. If virtual map 615 is translated physically, the new edge may be rendered to reflect the layers at that portion of the map. The edge treatment may additionally or alternatively be adjusted based on a time-based translation of a 3D object. For example, if virtual map 615 is translated over time, but not spatially, object edges 627 and 628 may be rendered so as to reflect the changing earth layers over time. In another example, the 3D object may be a model of a heart. The model may be translated spatially, so that the object edge is updated based on a selected cross-section of the heart. At a given cross section, the model may be translated temporally, so that the object edge shows updated blood flow, plaque development, stenosis, etc.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
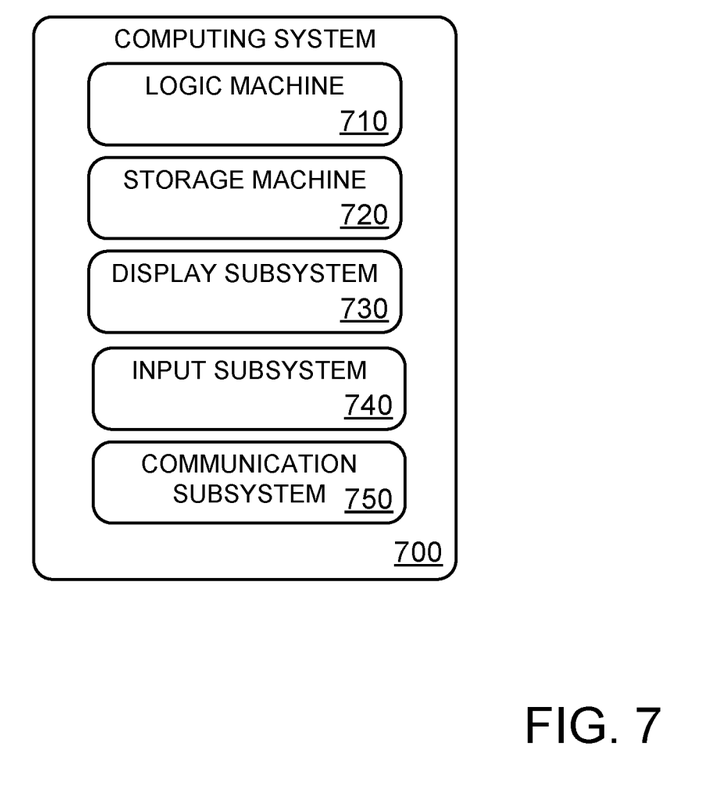
FIG. 7 shows a block diagram of an example computing device.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a storage machine 720. Computing system 700 may optionally include a display subsystem 730, input subsystem 740, communication subsystem 750, and/or other components not shown in FIG. 7.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system?? implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 750 may be configured to communicatively couple computing system 700 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In one example, a method for presenting a three-dimensional (3D) object on a display screen comprises: receiving, at a graphics processing unit, object data representing a model of a 3D object, the object data including a plurality of interrelated polygons; receiving, at the graphics processing unit, coordinates for one or more clipping boundaries, the one or more clipping boundaries defining a presentation region that overlaps at least in part with visible portions of the display screen; using a geometry shader, performing per-polygon clipping on each polygon of the object data that intersects with at least one clipping boundary; and presenting, on the display screen, only portions of the 3D object that lie within the presentation region. In such an example, or any other example, the method may additionally or alternatively comprise: at a pixel shader, receiving object data representing a clipped model of the 3D object; and at the pixel shader, rendering only pixels of the 3D object that lie within the presentation region. In any of the preceding examples, or any other example, each polygon that lies entirely within the presentation region may additionally or alternatively be passed to the pixel shader without being clipped by the geometry shader. In any of the preceding examples, or any other example, each polygon may additionally or alternatively be a triangle. In any of the preceding examples, or any other example, each triangle that overlaps exactly one clipping boundary may additionally or alternatively be clipped once at the geometry shader. In any of the preceding examples, or any other example, each triangle that overlaps exactly two clipping boundaries may additionally or alternatively be clipped twice at the geometry shader. In any of the preceding examples, or any other example, each triangle that overlaps three or more clipping boundaries may additionally or alternatively be clipped at the geometry shader, and wherein per-triangle clipping may additionally or alternatively be subsequently performed for each clipped triangle. In any of the preceding examples, or any other example, the geometry shader may additionally or alternatively designate each primitive within the clipped model that intersects with one or more clipping boundaries as an edge primitive. In any of the preceding examples, or any other example, the pixel shader may additionally or alternatively render each pixel derived from an edge primitive using a predetermined edge treatment. In any of the preceding examples, or any other example, the display screen may additionally or alternatively be a see-through display screen. In any of the preceding examples, or any other example, the one or more clipping boundaries may additionally or alternatively be fixed to a real-world object visible through the see-through display screen. In any of the preceding examples, or any other example, the one or more clipping boundaries may additionally or alternatively be fixed to a virtual world object presented on the see-through display screen.

In another example, a method for presenting a three-dimensional (3D) object on a display screen, comprises receiving, at a graphics processing unit, object data representing a model of a 3D object, the object data including a plurality of interrelated polygons; receiving, at the graphics processing unit, coordinates for one or more clipping boundaries, the one or more clipping boundaries defining a presentation region that overlaps at least in part with visible portions of the display screen; using a geometry shader, performing per-polygon clipping on each polygon of the object data that intersects with at least one clipping boundary to generate a clipped model of the 3D object; using the geometry shader, designating each primitive within the clipped model that intersects with one or more clipping boundaries as an edge primitive; using a pixel shader, rendering each pixel derived from an edge primitive using a predetermined edge treatment; and presenting, on the display screen, the clipped model of the 3D object such that the predetermined edge treatment is visible at the clipping boundaries. In such an example, or any other example, the geometry shader may additionally or alternatively be configured to designate each primitive adjacent to an edge primitive as an edge-adjacent primitive. In any of the preceding examples, or any other example, the geometry shader may additionally or alternatively be configured to indicate a distance to a nearest edge for each primitive of the clipped model of the 3D object. In such an example, or any other example, the method may additionally or alternatively comprise: at a rasterizer, receiving the clipped model of the 3D object from the geometry shader; converting each primitive in the clipped model to a plurality of pixels; and retaining edge information for each primitive in each corresponding pixel. In such an example, or any other example, the method may additionally or alternatively comprise: at the pixel shader, rendering each of the plurality of pixels based on the distance to the nearest edge. In such an example, or any other example, the method may additionally or alternatively comprise: at the pixel shader, adjusting the predetermined edge treatment based on a time-based translation of the 3D object.

In yet another example, a head-mounted display device comprises a see-through display; and a controller configured to: receive, at a graphics processing unit, object data representing a model of a 3D object, the object data including a plurality of interrelated polygons; receive, at the graphics processing unit, coordinates for one or more clipping boundaries, the one or more clipping boundaries defining a presentation region that overlaps at least in part with visible portions of the see-through display; using a geometry shader, perform per-polygon clipping on each polygon of the object data that intersects with at least one clipping boundary; using the geometry shader, designate each primitive within the clipped model that intersects with one or more clipping boundaries as an edge primitive; at a pixel shader, receive object data representing a clipped model of the 3D object; using the pixel shader, render each pixel derived from an edge primitive using a predetermined edge treatment; and at the pixel shader, render only pixels of the 3D object that lie within the presentation region. In such an example, or any other example, the one or more clipping boundaries may additionally or alternatively be fixed to a real-world object visible through the see-through display screen.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for presenting a three-dimensional (3D) object on a display screen, comprising:
    receiving, at a graphics processing unit, object data representing a model of a 3D object, the object data including a plurality of interrelated polygons;
    receiving, at the graphics processing unit, coordinates for a field-of-view of the display screen, the field-of-view representing a spatial region in which object data may be presented on the display screen;
    receiving, at the graphics processing unit, coordinates for one or more multi-dimensional clipping boundaries, the one or more multi-dimensional clipping boundaries dividing the field-of-view of the display screen into at least one presentation region and at least one non-presentation region;
    using a geometry shader, performing per-polygon clipping on each polygon of the object data that intersects with at least one multi-dimensional clipping boundary to generate a clipped model;
    using the geometry shader, designating each primitive within the clipped model that intersects with one or more multi-dimensional clipping boundaries;

using a pixel shader, rendering each pixel included in a designated primitive; and presenting, on the display screen, only portions of the 3D object that lie within the at least one presentation region such that a visible, multi-dimensional surface comprising each rendered pixel is visible at the multi-dimensional clipping boundaries within the field of view of the display screen.

2. The method of claim 1, further comprising:
at the pixel shader, receiving object data representing the clipped model of the 3D object; and
at the pixel shader, rendering only pixels of the 3D object that lie within the at least one presentation region.

3. The method of claim 2, wherein each polygon that lies entirely within the at least one presentation region is passed to the pixel shader without being clipped by the geometry shader.

4. The method of claim 3, wherein each polygon is a triangle.

5. The method of claim 4, wherein each triangle that overlaps exactly one multi-dimensional clipping boundary is clipped once at the geometry shader.

6. The method of claim 4, wherein each triangle that overlaps exactly two multi-dimensional clipping boundaries is clipped twice at the geometry shader.

7. The method of claim 4, wherein each triangle that overlaps three or more multi-dimensional clipping boundaries is clipped at the geometry shader, and wherein per-triangle clipping is subsequently performed for each clipped triangle.

8. The method of claim 2, wherein the geometry shader designates each primitive within the clipped model that intersects with one or more clipping boundaries as an edge primitive.

9. The method of claim 8, wherein the pixel shader renders each pixel derived from an edge primitive using a predetermined edge treatment, such that the clipped model includes one or more multi-dimensional surfaces that are not included in the object data representing the model of the 3D object.

10. The method of claim 1, wherein the display screen is a see-through display screen.

11. The method of claim 10, wherein the one or more multi-dimensional clipping boundaries are fixed to a real-world object visible through the see-through display screen.

12. The method of claim 11, wherein the one or more multi-dimensional clipping boundaries are fixed to a virtual world object presented on the see-through display screen.

13. A method for presenting a three-dimensional (3D) object on a display screen, comprising:
receiving, at a graphics processing unit, object data representing a model of a 3D object, the object data including a plurality of interrelated polygons;
receiving, at the graphics processing unit, coordinates for a field-of-view of the display screen, the field-of-view representing a spatial region in which object data may be presented on the display screen;
receiving, at the graphics processing unit, coordinates for one or more multi-dimensional clipping boundaries, the one or more multi-dimensional clipping boundaries dividing the field of view of the display screen into at least one presentation region and at least one non-presentation region;
using a geometry shader, performing per-polygon clipping on each polygon of the object data that intersects with at least one multi-dimensional clipping boundary to generate a clipped model of the 3D object;

using the geometry shader, designating each primitive within the clipped model that intersects with one or more multi-dimensional clipping boundaries as an edge primitive;
using a pixel shader, rendering each pixel derived from an edge primitive using a predetermined edge treatment; and
presenting, on the display screen, the clipped model of the 3D object such that a visible multi-dimensional surface comprising the predetermined edge treatment is visible at the multi-dimensional clipping boundaries within the field of view of the display screen.

14. The method of claim 13, wherein the geometry shader is configured to designate each primitive adjacent to an edge primitive as an edge-adjacent primitive.

15. The method of claim 14, wherein the geometry shader is configured to indicate a distance to a nearest edge for each primitive of the clipped model of the 3D object, the distance to the nearest edge for each primitive based at least on a distance between a nearest vertex of each primitive to the nearest edge.

16. The method of claim 15, further comprising:
at a rasterizer, receiving the clipped model of the 3D object from the geometry shader;
converting each primitive in the clipped model to a plurality of pixels; and
retaining edge information for each primitive in each corresponding pixel.

17. The method of claim 16, further comprising:
at the pixel shader, rendering each of the plurality of pixels based on the distance to the nearest edge.

18. The method of claim 13, further comprising:
at the pixel shader, adjusting the predetermined edge treatment based on a time-based translation of the 3D object.

19. A head-mounted display device, comprising:
a see-through display; and
a controller, configured to:
receive, at a graphics processing unit, object data representing a model of a 3D object, the object data including a plurality of interrelated polygons;
receive, at the graphics processing unit, coordinates for a field-of-view of the see-through display, the field-of-view representing a spatial region in which object data may be presented on the see-through display;
receive, at the graphics processing unit, coordinates for one or more multi-dimensional clipping boundaries, the one or more multi-dimensional clipping boundaries dividing the field of view of the see-through display into at least one presentation region and at least one non-presentation region;
using a geometry shader, perform per-polygon clipping on each polygon of the object data that intersects with at least one clipping boundary;
using the geometry shader, designate each primitive within the clipped model that intersects with one or more multi-dimensional clipping boundaries as an edge primitive;
at a pixel shader, receive object data representing a clipped model of the 3D object;
using the pixel shader, render each pixel derived from an edge primitive using a predetermined edge treatment to generate a multi-dimensional object surface that is visible at one or more multi-dimensional clipping boundaries within the field of view of the see-through display; and at the pixel shader, render only pixels of the 3D object that lie within the at least one presentation region.

20. The head-mounted display device of claim 19, wherein the one or more multi-dimensional clipping boundaries are fixed to a real-world object visible through the see-through display screen.

* * * * *